United States Patent [19]
Mueller et al.

[11] Patent Number: 6,009,398
[45] Date of Patent: Dec. 28, 1999

[54] CALENDAR SYSTEM WITH DIRECT AND TELEPHONY NETWORKED VOICE CONTROL INTERFACE

[75] Inventors: Hans-Peter Mueller, Longmont; Louis Anthony Cox, Jr., Denver, both of Colo.

[73] Assignees: U S West, Inc., Denver, Colo.; MediaOne Group, Inc., Englewood, Colo.

[21] Appl. No.: 08/843,980

[22] Filed: Apr. 18, 1997

[51] Int. Cl.$^6$ ........................................................ G10L 3/00
[52] U.S. Cl. .............................................................. 704/275
[58] Field of Search ...................... 345/963; 364/705.08, 364/705.01, 705.07; 704/200, 272, 275, 270

[56] References Cited

U.S. PATENT DOCUMENTS

| | | |
|---|---|---|
| 3,928,724 | 12/1975 | Bryam et al. . |
| 4,677,569 | 6/1987 | Nakano et al. . |
| 4,755,932 | 7/1988 | Diedrich ................................. 395/500 |
| 4,785,408 | 11/1988 | Britton et al. . |
| 4,819,191 | 4/1989 | Scully et al. ............................ 345/329 |
| 5,093,854 | 3/1992 | Sucato . |
| 5,113,380 | 5/1992 | Levine ..................................... 368/10 |
| 5,291,597 | 3/1994 | Shorter et al. .......................... 395/650 |
| 5,315,703 | 5/1994 | Matheny et al. ....................... 345/507 |
| 5,335,276 | 8/1994 | Thompson et al. . |
| 5,524,051 | 6/1996 | Ryan ........................................ 380/9 |
| 5,615,296 | 3/1997 | Stanford et al. ....................... 704/201 |
| 5,664,063 | 9/1997 | Johnson et al. ......................... 395/10 |

FOREIGN PATENT DOCUMENTS 60-120429  6/1985  Japan .

OTHER PUBLICATIONS

IBM Technical Disclosure Bulletin, vol. 33, No. 11, Apr. 1991.
Levinson et al., 1980, *The Bell System Technical Journal*, vol. 59, No. 1, pp. 119–137.
Schmandt et al., 1990, *Computer*, 23(8):50–56.
Roszkiewicz, *A+ Magazine*, Feb. 1984, pp. 60–61.
Verbex Voice Systems, Inc. advertising brochure for "Listen for Windows", 1994.

*Primary Examiner*—David R. Hudspeth
*Assistant Examiner*—Donald L. Storm
*Attorney, Agent, or Firm*—Holme, Roberts & Owen, LLP

[57] ABSTRACT

An electronic calendar system is disclosed wherein the calendar system can interact with a user entirely auditorially, e.g. via speech based interactions, entirely visually, or a combination of both. Moreover, the present invention utilizes context information regarding the state or configuration of the calendar system so that substantially at any time a user may query the calendar system for informing the user of the current state of the calendar system. Accordingly, the present invention is particularly useful for users who communicate with the calendar system substantially or entirely auditorially. The user may contact a processing module in the calendar system through a telecommunications network such as a telephone network, a cable network or through the worldwide web. The system includes an apparatus for converting speech to text streams and vice versa. In such an interaction mode, a user can utter a phrase such as, "Where am I?" and the present invention is able to provide a response that assists the user in maintaining effective communication with the calendar system. Accordingly, the present invention is particularly useful for telephony users wherein a standard telephone is the user communication device to the calendar system of the present invention.

18 Claims, 11 Drawing Sheets

CALENDAR SYSTEM WITH DIRECT AND TELEPHONY NETWORKED VOICE CONTROL INTERFACE

FIELD OF THE INVENTION

The present invention relates to calendar systems for recording appointments wherein a user may control calendar system operation as well as input calendar data using speech via input into a telephony infrastructure directly or via input into, for example, a personal computer. The present invention is particularly useful when a visual display is not available and for users with visual or hand coordination handicaps.

BACKGROUND OF THE INVENTION

Electronic calendaring systems have provided users with a way to keep track of their schedules, appointments and related information. Typically, such calendaring systems provide a visual user interface. In many cases, however, a visual user interface is unnecessary. Further, it may be inadequate. As an example, consider a salesperson having access only to a standard telephony phone, but who desires to maintain his/her calendar at his/her sales headquarters. Accordingly, it would be desirable to be able to interact with such an electronic calendaring system for entering appointments and the like audibly via the phone. Additionally, consider an individual having a handicap or by preference desiring at least some interaction with a calendaring system to be audio or speech based rather than visual. In this context, it would also be desirable to have a speech based calendaring system.

SUMMARY OF THE INVENTION

The present invention is a method and system for providing a speech based interface to an electronic calendar system for annotating calendar designated time periods as when scheduling, for example, appointments and events. In particular, the present invention provides a speech based interface wherein both the user and the calendar system may communicate with one another substantially verbally, or by keyboard and mouse or all of the above, wherein such communication may be performed in a variety of ways. That is, such communication may be performed through a telephony network wherein various functional components of the present invention may be distributed within the telephony network, and/or the functional components may reside at a central site either within the telephony network or on, for example, a user's personal computer. Accordingly, a user may verbally request speech feedback from the electronic calendar system regarding a current state or context related to: (a) a current configuration of the calendar system, (b) information previously provided by the user to the calendar system, and (c) a currently active activity or command in the calendaring system. More particularly, the user may verbally request speech feedback from the present invention for identifying commands, identifying data fields of commands and outputting speech corresponding to the data previously provided to such data fields. Moreover, such user requests for contextual information can be requested by and supplied to the user at indeterminate times. That is, a user may at substantially any time request verbal feedback related to the context and/or status of the user's current interaction with the calendar system of the present invention.

Furthermore, the present invention provides a modular architecture wherein modules embodying various functional components for the present invention may be commercially available and such components may be co-located with the user or distributed through, for example, a telephony network. Thus, the present invention may, in one embodiment, reside wholly on a single personal computer or, alternatively, various components may be distributed within a telecommunications network such as a telephony network, a cable network or an internet network. Thus, a user may, in some of these latter embodiments, access and activate the present invention remotely by telephone voice activation. Accordingly, such telephone voice control of the present invention may be performed without the need for the user to have a personal computer or other relatively inexpensive computational device (PDA, etc.).

In another embodiment, the present invention may provide coordinated speech and text feedback when the user's input/output device (e.g., a personal computer) supports both speech based and text based output.

However, it is an object of the present invention to provide sufficient verbal interaction capabilities so that a user can effectively utilize the present calendar system (e.g., enter, modify, delete, list and search for calendar entries) without visual support such as graphic and/or text based support. Thus, the present invention, although useful to the public in general, is particularly useful to visual-impaired users and to users unable to effectively provide text based input via, e.g., a keyboard or mouse. Further, the present invention is also useful to users (e.g., salespersons) having substantially only access to a telephone as an input/output device for accessing the calendaring system of the present invention.

Other features and benefits of the present invention will become apparent from the detailed description with the accompanying figures contained hereinafter.

BRIEF DESCRIPTION OF THE DRAWINGS

FIGS. 4A, 4B, 4C and 4D present a flow chart that is a continuation of the flow chart for FIGS. 3A and 3B, wherein the steps in FIGS. 4 provide further details illustrating the steps performed when a user interacts with the present invention.

DETAILED DESCRIPTION

Figure 1A:
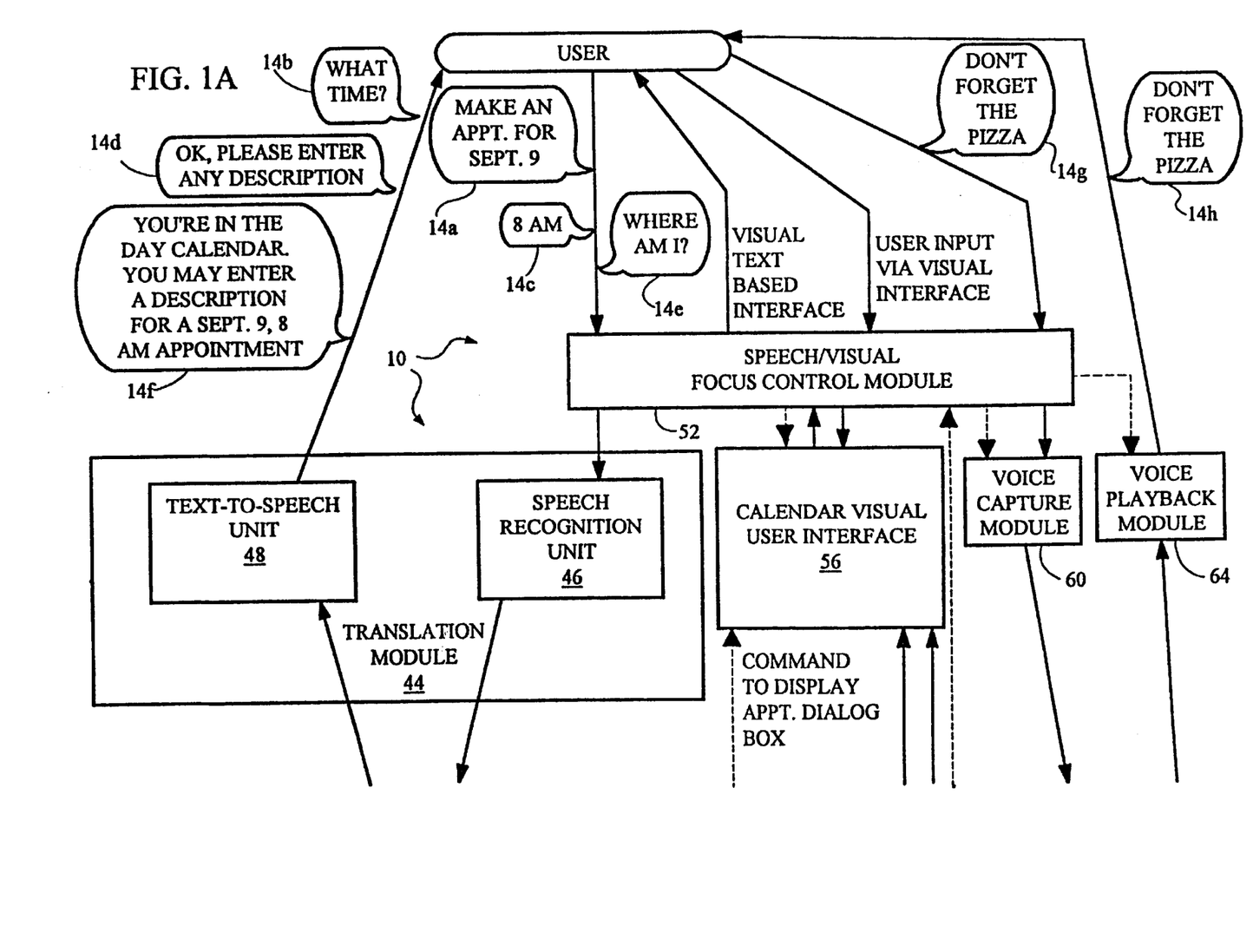
FIGS. 1A and 1B present a block diagram of the functional components of the present invention together with data flows (solid arrows) and control flows (dashed arrows)
Figure 1B:
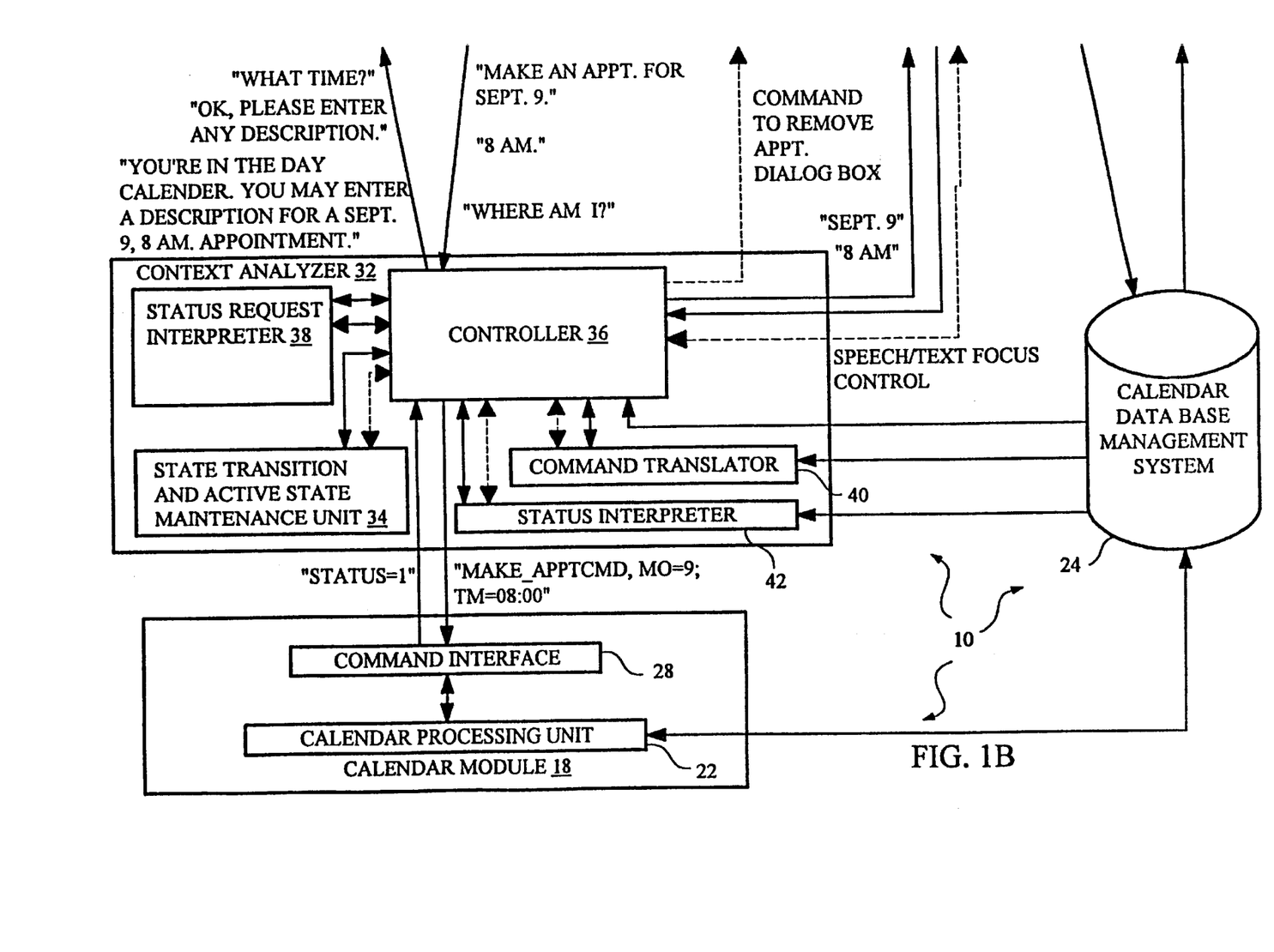

In FIGS. 1A and 1B, a block diagram of the electronic calendar system 10 of the present invention is presented along with data flow lines (solid arrows) and control flow lines (dashed arrows). Further, to illustrate the information being communicated along the data flow lines, adjacent to some of these lines are examples of the data communicated on the line, wherein text in dialog inserts (e.g., dialog inserts 14) describe verbalizations spoken by either the user or the calendaring system 10.

The calendar command processing functionality primarily resides in the calendar module 18 of FIG. 1B. That is, this module provides the operations for manipulating calendar data types such as data types for appointments, days, months, and years. Thus, this module provides the necessary operations for insertion, modification and deletion of calendar information according to user requests. To accomplish this basic calendar processing functionality, the calendar module 18 includes a calendar processing unit 22 providing substantially all of the calendar programs for processing calendar data of the calendaring system 10 and accordingly, the calendar processing unit may be in any one of a plurality of states depending, for example, on the input received, wherein each state may be defined as a configuration for the performance of any action from a predetermined set of actions dependent on the state. Accordingly, the calendar processing unit 22 interacts with the calendar database management system 24 for storing and retrieving such calendar data as needed to process user requests. Thus, the calendar database management system 24 is the primary repository for long term storage of calendar data for a user.

The calendar module 18 also includes a command interface 28 for receiving calendar commands to be processed and for returning status information indicating, for example, the success or failure of a calendar operation requested to be performed. Note that the command interface 28 communicates with the context analyzer module 32 (described hereinbelow) when receiving calendar commands and returning statuses.

The context analyzer module 32 is essentially a user interface control module that substantially controls the activities of other functional modules of the calendaring system 10 that provide user interface capabilities. In order to provide this capability, it is desirable that the context analyzer module 32 include a capability to track and maintain information regarding context or status of the calendaring system 10 so that user inquiries such as, "Where am I?" may be responded to effectively. Note that effective responses to such user inquiries is an important aspect of the present invention in that when a user is interacting with the present invention substantially through verbal communication, it may not be uncommon for the user (e.g., a visually impaired or blind person) to forget the context of a current state of the calendaring system 10. Thus, the context analyzer module 32 and, in particular, the state transition and active state maintenance unit 34 provides a detailed description of processing states that can be entered into by at least the calendar module 18, and in some embodiments, a description of processing states related to the state of the overall calendar system 10 as well. Accordingly, such detailed state transition information may be used to effectively respond to a user's inquiry such as, "Where am I?".

In providing its controlling function, the context analyzer 32 includes a controller 36 for coordinating and activating components of the context analyzer 32. In addition to the state transition and active state maintenance unit 34, the controller 36 also controls activation of the status request interpreter 38. The status request interpreter 38 is provided with a contextual representation of substantially all user input for determining whether the user has requested feedback related to the status of the calendar system 10. For example, the status request interpreter 38 is responsible for detecting such sentences and/or phrases as, "Where am I?".

Note that since the calendar module 18 may be provided by a third party, the commands that this module accepts and the status codes returned may be cryptic and may vary between embodiments of the calendar module 18. Accordingly, the context analyzer 32 includes a command translator 40 and a status interpreter 42 for translating between the communication formalism of the calendar module 18 and a standardized formalism utilized by substantially all other components of the present invention. Thus, the controller 36 controls activation of the command translator 40 for translating user supplied text based representations of calendar commands and outputting low level (possibly cryptic) calendar module 18 command strings that the controller 36, in turn, inputs to the calendar module. Conversely, the controller 36 also controls activation of the status interpreter 42 for interpreting status codes output by the calendar module 18 and providing the controller with the standardized equivalent for the status codes output by the calendar module. Thus, the controller 36, when provided with interpretations for the status codes, may in turn provide these interpreted status codes to the state transition and active state maintenance unit 34 for updating the state of the present invention.

The context analyzer 32 receives and/or sends information to most of the other functional components represented in FIGS. 1A and 1B. That is, in addition to the communication with the calendar module 18, the context analyzer 32 also communicates with a translation module 44 that provides the speech-to-text and text-to-speech capabilities so that a user may effectively utilize the capabilities of the calendar application module 18 solely through voice communication. In particular, the translation module 44 includes a speech recognition unit 46 for correlating speech waveforms with text from a predetermined vocabulary. Note that the speech recognition unit 46 may be trained to a particular user's speech patterns and/or may be configured to recognize more than one language or dialect. Accordingly, the speech recognition unit 46 outputs text strings deemed to be the most likely translation of the user's input speech. Additionally, the translation module 44 also includes a text-to-speech unit 48 for translating natural language text into speech. Note that it is contemplated that the speech recognition unit 46 and the text-to-speech unit 48 may be commercially available products such as Dragon System's "DRAGON DICTATE", Kurzweil's "VOICE FOR WINDOWS" and IBM's "VOICE TYPE", as well as other speech recognition systems.

The context analyzer 32 also communicates with the calendar database management system 24 for receiving stored information describing a state transition graph for (at least) states of the calendar module 18. Thus, the context analyzer 32 and, in particular, the state transition and active state maintenance unit 34 is substantially data or table driven via the state transition information retrieved from the calendar database management system 24.

In one embodiment of the present invention, where the user is provided with text displays via, for example, a graphical user interface, the context analyzer 32 may provide high level visual display commands to one or more user interface modules for displaying text, wherein such text displays are coordinated with any speech interactions between the user and the calendaring system 10. That is, a user may provide some input to the calendaring system 10 via speech and other input via a text based graphical user interface such that for a given sequence of calendar inputs the user may intermingle speech input with text based input, or, alternatively, the user may provide all input verbally and receive all output via text based displays (e.g., in the case when the user is deaf), or, alternatively, the user may provide substantially all input via text and prefer to listen to a response rather than view it (e.g., in the case when the user is visually impaired or blind). Accordingly, to satisfy the above combinations of how a user would prefer to interact with the calendaring system 10 of the present invention, the context analyzer 32 coordinates the speech interactions and the visual interface so that any verbal interactions between the user and the calendaring system 10 are, in parallel, also reflected in the text based user interface, and any text based interactions between the user and the calendaring system 10 may have coordinated verbal responses generated by the calendaring system 10. Accordingly, the context analyzer 32 exchanges control flow information with the speech/text control focus module 52, wherein this latter module determines not only whether the focus of user input is either speech or text, but also determines the focus of control for identifying the portion of any visual interface to which user input textual information applies. Additionally, the context analyzer 32 also communicates with the calendar visual user interface 56 for communicating user interface commands to the calendar visual user interface 56 and for both supplying to the calendar visual user interface translations of user speech for display as well as receiving text input from the visual user interface. Note that the calendar visual user interface 56 receives substantially all visually related input and output from the user via the speech/visual focus control module 52.

The present invention also includes a voice capture module 60 and a voice playback module 64. The voice capture module 60 is used for recording speech that may be played back to the user at a later time. Accordingly, this module and its companion, the voice playback module 64, may be used for communication of speech wherein the speech-to-text unit 48 is either not appropriate or is not sufficiently reliable for the user's speech. In particular, this may be important for handicapped users that have difficulty in clearly enunciating words. Note that both the voice capture module 60 and the voice playback module 64 are controlled by the context of a user's command.

Figure 2:
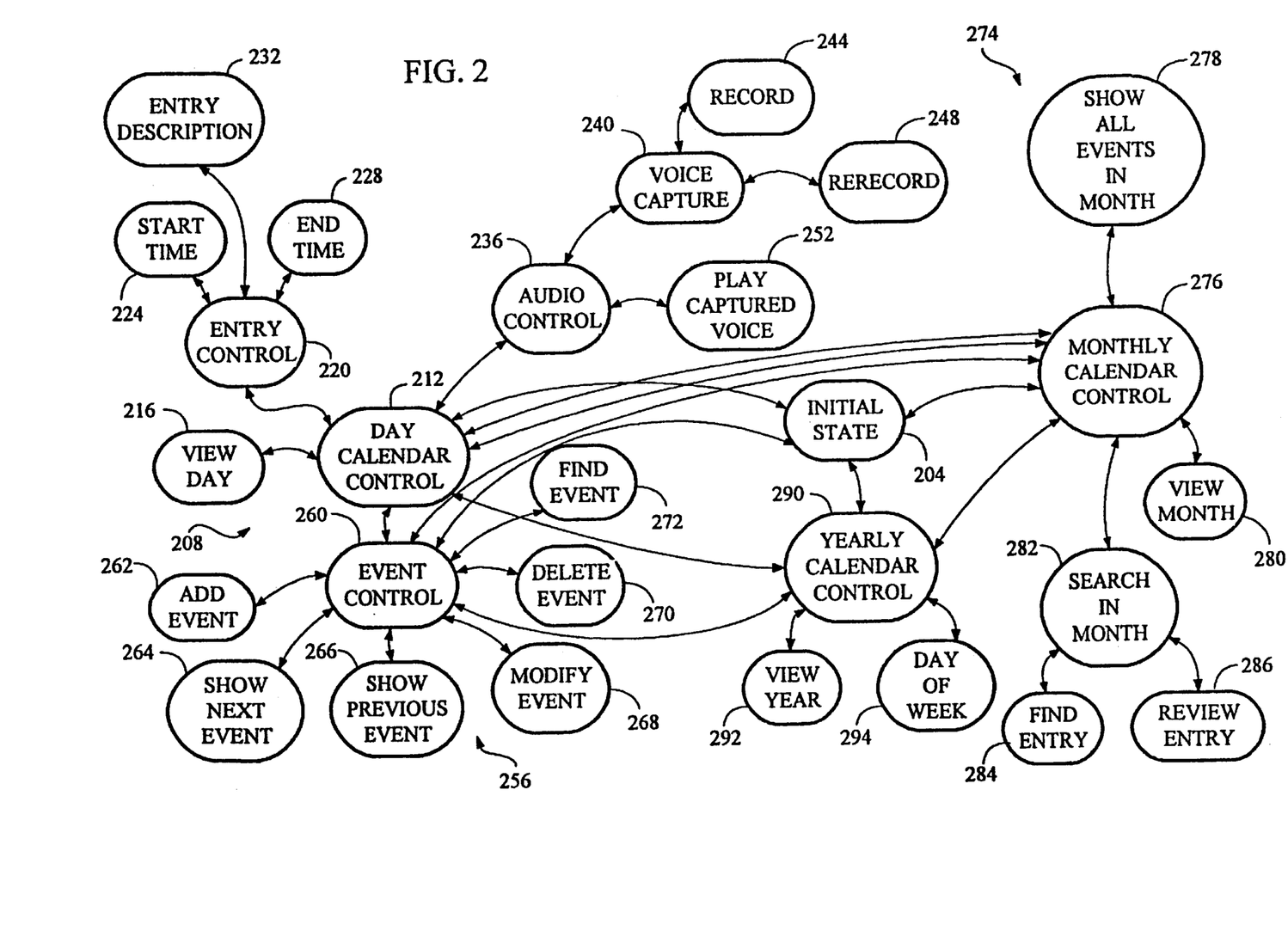
FIG. 2 is a high level example of a state transition diagram for much of the calendar system 10 of the present invention, wherein a representation of the state diagram is incorporated into this state transition and active state maintenance unit 34 of the context analyzer 32 used in responding to user requests for contextual information.

FIG. 2 presents a high level example of a state transition diagram characterizing the states of the electronic calendar system 10 of the present invention. Note that the present invention must be capable of representing such states so that, for example, a user of the present invention may receive a current system processing context or status in response to a user input such as, "Where am I?" In particular, a representation of the state transition diagram of FIG. 2 is utilized by the state transition and active state maintenance unit 34 for maintaining electronic calendar system 10 context information to be supplied to the user upon request. The state diagram of FIG. 2 includes an initial state 204 and four clusters of states accessible (via state transition arrows) from the initial state 204. In particular, from the initial state 204 the day calendar state cluster 208 is accessible via the day calendar control state 212. Accordingly, the day calendar state cluster 208 includes:

(1.1) A view day state 216 for visually displaying a day calendar for a user specified day.
(1.2) An entry control state 220 from which a user may provide a day calendar entry by supplying a start time for the entry (via transitioning to the start time state 224), supplying an end time for the entry (by transitioning to the end time state 228), and by supplying a description for the day calendar entry (via transitioning to the entry description state 232).

(1.3) An audio control state 236 for configuring the present invention so that more specific audio related states may be transitioned therefrom. In particular, a voice capture state 240 may be entered and subsequently either a record state 244 or a rerecord state 248 may be entered for (re) recording a user message via, for example, the voice capture module 60. Also, the audio control state 236 provides access to the play captured voice state 252 wherein the electronic calendar system 10 of the present invention activates the voice playback module 64 for playing back a user designated recording.

Additionally, the initial state 204 also provides access to a calendar processing state cluster 256 having an event control state 260 from which all other states of this cluster are accessible and in which the present invention is configured for processing event related information. For example, the event control state 260 may activate an event processing visual user interface. The other states for the event processing state cluster are as follows:

(2.1) An add event state 262 for adding an event description to the calendar system 10.
(2.2) A show next event state 264, wherein a user may request the next event that has been previously scheduled to be shown and/or verbally presented to the user.
(2.3) A show previous event 266, wherein the user may request a display of event information related to an event prior to a user designated time or day.
(2.4) A modify event state 268, wherein the calendar system 10 is configured so that the user may modify previously entered event information.
(2.5) A delete event state 270, wherein the calendar system is configured so that the user may delete an event description entirely from the system.
(2.6) A find event state 272, wherein a user can request that information on a particular event (e.g., a birthday) be retrieved from, for example, the calendar database management system 24.

A monthly calendar state cluster 274 is accessible from the initial state 204. This cluster has an initial entry state, the monthly calendar control state 276, that configures the calendar system 10 for processing monthly calendar commands provided by the user. For example, this state may configure a visual user interface with commands and data fields related to displaying monthly calendars and/or configuring the controller 36 to recognize certain predetermined monthly calendar related speech forms that may be input to the controller via the speech recognition unit 46. The following additional states are provided in this cluster:

(3.1) A show all events in a selected month state 278, wherein the user may select the month in which all events that have been entered into the calendar system 10 for the selected month are displayed to the user.
(3.2) A view month state 280, wherein the user may select a particular month to view (and/or provide further audio interactions related to) the calendar of the selected month.
(3.3) A search in month state 282, wherein the calendar system of the present invention is configured for searching through calendar entries in a user selected month. In particular, this state allows the user to transition to a find entry state 284 for finding a particular entry within a user designated month, and a review state 286 for allowing a user to view and/or listen to a calendar entry in a user designated month.

The initial state 204 also provides access to states for providing the user with calendar information related to a user designated yearly calendar. In particular, the yearly calendar control state 290 is provided for configuring the calendar system 10 to accept input (either visually related input or spoken input) for particular yearly calendar commands such as a view year command associated with the view year state 292 for viewing a user designated year. Or, alternatively, for activating a determined day of the week command wherein the day of week state 294 is entered, thereby allowing the user to request the day of the week to which a particular date corresponds.

Note that it is an important aspect of the present invention that substantially every state as, for example, illustrated in FIG. 2, configures the calendar system 10 according to user selected user interaction techniques. For example, the user may specify various combinations of visual and auditory input and output when configuring the calendar system 10. Thus, each of the states as described in FIG. 2 may set values for user interaction techniques such as a particular graphical user interface and/or text to be spoken to the user.

Figure 3A:
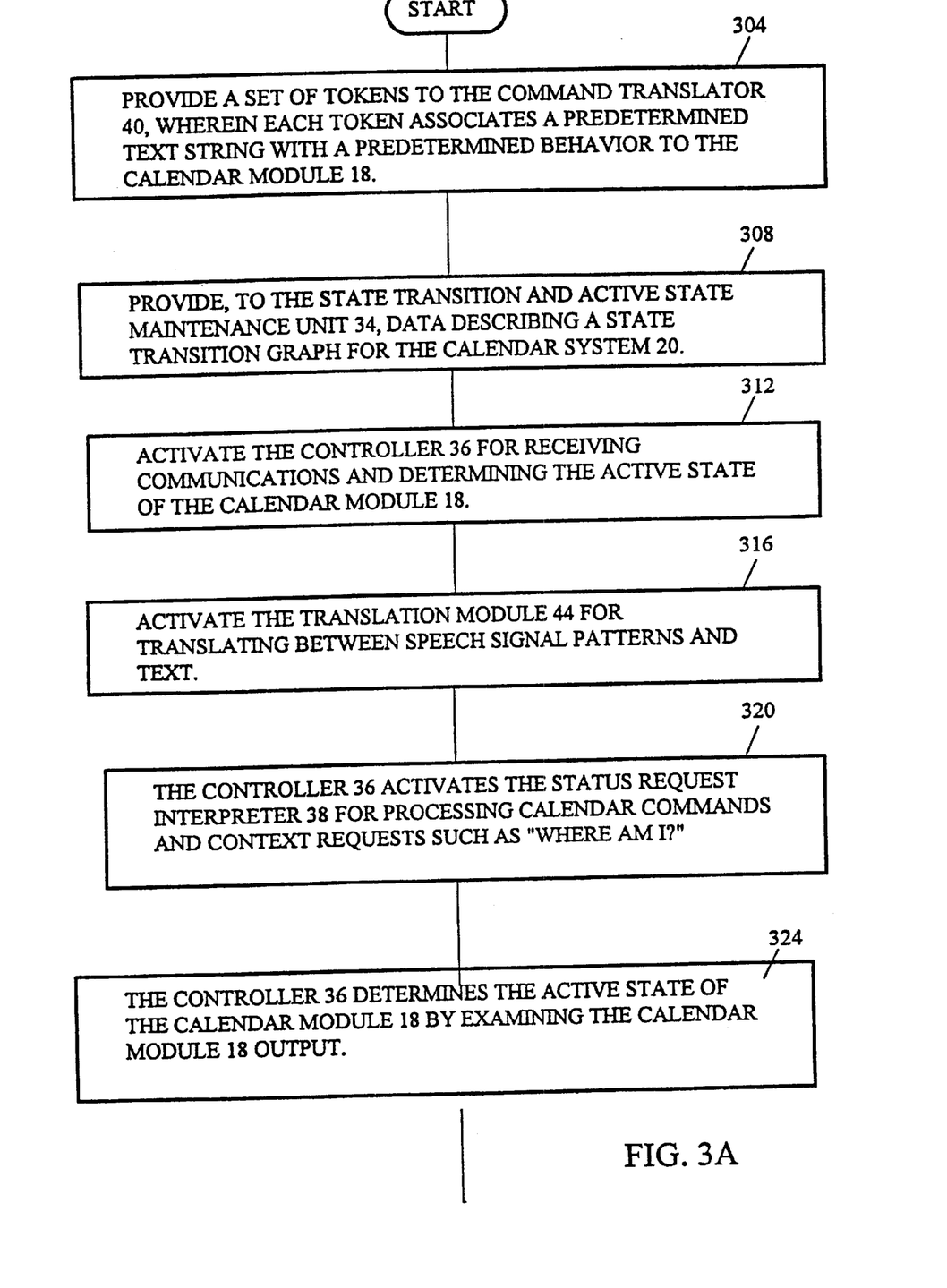
FIGS. 3A and 3B present a flow chart providing the high level steps performed when a user is interacting with the present invention, and in particular, during initialization of the present invention.
Figure 3B:
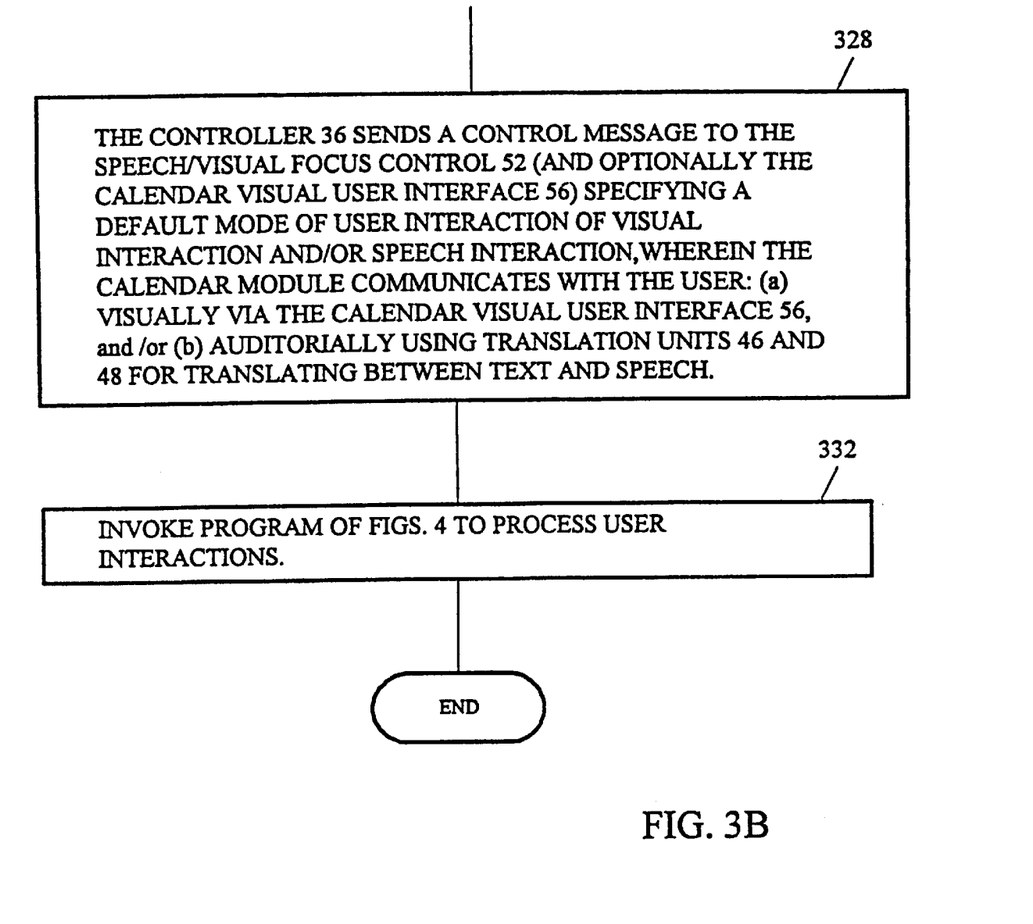

The flow chart of FIGS. 3A and 3B show the high level steps performed by the present invention. In particular, the steps of this flow chart illustrate the steps performed during initial activation of the calendar system 10. Accordingly, in step 304, a set of tokens or command string templates for providing commands in an acceptable form to the calendar module 18 are retrieved by the controller 36 from the calendar data base management system 24 and subsequently supplied to the command translator 40. Additionally, with each such token, the controller 36 also retrieves a corresponding predetermined text string for identifying and describing the behavior of the calendar module 18 when performing the action identified by the token to which the text string corresponds. Thus, in one embodiment of the present invention, the command translator 40 may retain a run time copy of each such token and its corresponding text string. Alternatively, the command translator 40 may request the set of tokens and corresponding text directly from the calendar data base management system 24 (as illustrated by the arrow between the calendar data base management system 24 and the command translator). Subsequently, in step 308, the state transition and active state maintenance unit 34 are provided with state transition graph information for the calendar system 10. Note that this state transition graph information is a representation of the state transition graph as shown, for example, in FIG. 2. In one embodiment of the present invention, the controller 36 retrieves such state transition information from the calendar data base management system 24 and subsequently provides it to the state transition and active state maintenance unit 34. However, as with the command translator 40, such state transition information may be retrieved directly by the state transition and active state maintenance unit 34.

In step 312, assuming the modules related to the context analyzer 32 and the calendar module 18 have been activated, the controller 36 initiates communication with the command interface 28 of the calendar module for determining the state of the calendar module 18. Note that upon receiving status information from the calendar module 18, the controller may provide this information to the state transition and active state maintenance unit 34 for determining and/or assuring that an appropriate initial state has been entered by the calendar module 18 in preparation for receiving user commands. In step 316, the translation module 44 is activated for translating between speech signal patterns and text. That is, the text-to-speech unit 48 and the speech recognition unit 46 are activated, and the controller 36 communicates with these two units for assuring proper communication with each one. Subsequently, in step 320, the controller 36 activates the status request interpreter 38 for processing user calendar commands and context requests. In particular, such context requests as a user spoken phrase, such as, "Where am I?", may be identified by the status request interpreter 38 and once the controller 36 is notified of such a context request being identified in a user input, the controller may invoke the state transition and active state maintenance unit 34 to supply text for satisfying the user's request. Following this step, in step 324, the controller 36 examines the output from at least the calendar module 18 for assuring that the calendar module is ready to accept command input. Note that particular attention may be paid to examining the calendar module 18 in preparation for user input in that the calendar processing unit 22 of this module may be any one of a number of commercially available calendar applications. Thus, depending on the calendar processing unit 22 incorporated into a particular embodiment of the present invention, one or more initial configuration commands and/ or status checks may be worthwhile for assuring proper communication and synchronization between the controller 36 and the calendar module 18.

In step 328, the controller 36 issues control messages for activation of the speech/visual focus control module 52 (and optionally, also to the calendar visual user interface 56) for specifying a default mode of user interaction. Note that as mentioned above, user interactions for the present invention may be substantially visual (e.g., a graphical user interface), substantially speech based, or a combination thereof (e.g., speech input and visual output or vice versa). Subsequently, in step 332, the program represented by the flow chart of FIGS. 4 is invoked to process user interactions with the present invention.

The flow chart of FIGS. 4A–4D illustrate the high level steps performed by the present invention when interacting with a user. Accordingly, in step 404, a determination is made as to which type of user interaction mode is specified. That is, a determination is made as to what form of user input the present invention has been configured to accept. Note that this determination is, in one embodiment, performed in the speech/visual focus control module 52 according to information provided to this module by the controller 36. Accordingly, if the determination is that the user input is to be supplied visually, then in step 408, the visual user interface 56 is activated for receiving visual input such as text and mouse clicks. Alternatively, if in step 404 a determination is made that the user input mode is speech, then the speech recognition unit 46 is activated for translating user speech signal patterns into text. Subsequently, in step 416, the calendar system 10 of the present invention waits for a next user input to be supplied. Note that in one embodiment of the present invention, the user may identify the mode in which the input is to be supplied immediately before supplying such input. Accordingly, the step 404 and its succeeding step (either step 408 or step 412) may be activated in response to a user input such as a microphone activation switch for inputting speech when on and allowing the user to input text when the microphone is inactive.

Figure 4A:
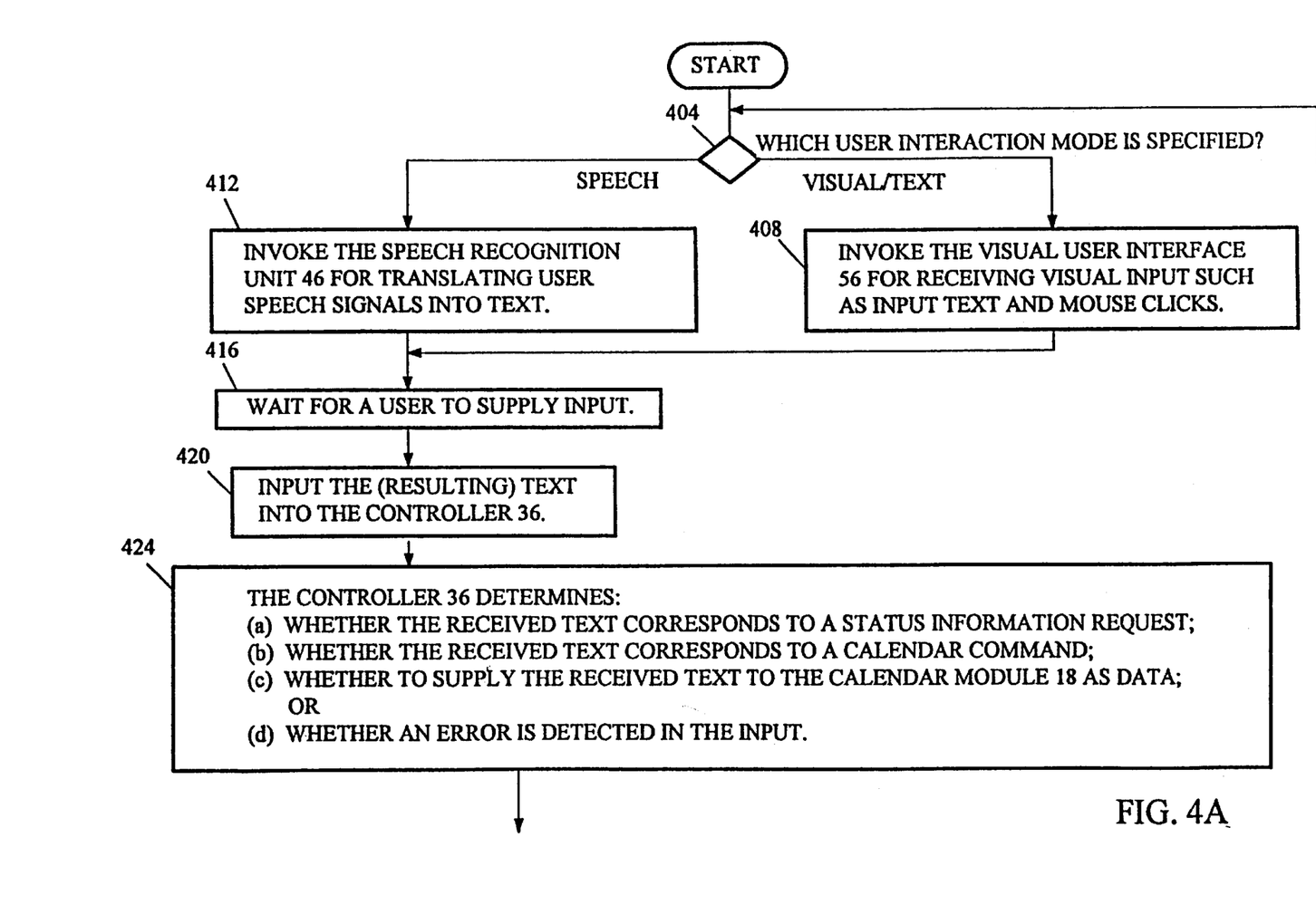

Assuming a user input corresponding to a calendar command and/or a request for context information relating to a current configuration of the calendar system 10, in step 420 text corresponding to the user's input is transferred to the controller 36 by either the speech recognition unit 46 (if the user's input was speech), or by the calendar visual user interface 56 (if the input was visual/text based). Subsequently, in step 424, the controller 36 utilizes other modules of the context analyzer 32 for determining how to process the input provided by the user. In particular, the following actions are performed:

(4.1) The controller invokes the status request interpreter 38 for determining whether the received input corresponds to a request for status or context information regarding the present state of the calendar system 10;

(4.2) If a status request is not determined (in 4.1 above), then the controller 36 determines whether the received text corresponds to a calendar command by invoking the command translator 40.

(4.3) Alternatively, the controller 36 may interpret the input text as data to be input to the calendar module 18.

(4.4) In some cases, however, the controller 36 may detect that the input is an error and respond accordingly.

Figure 4B:
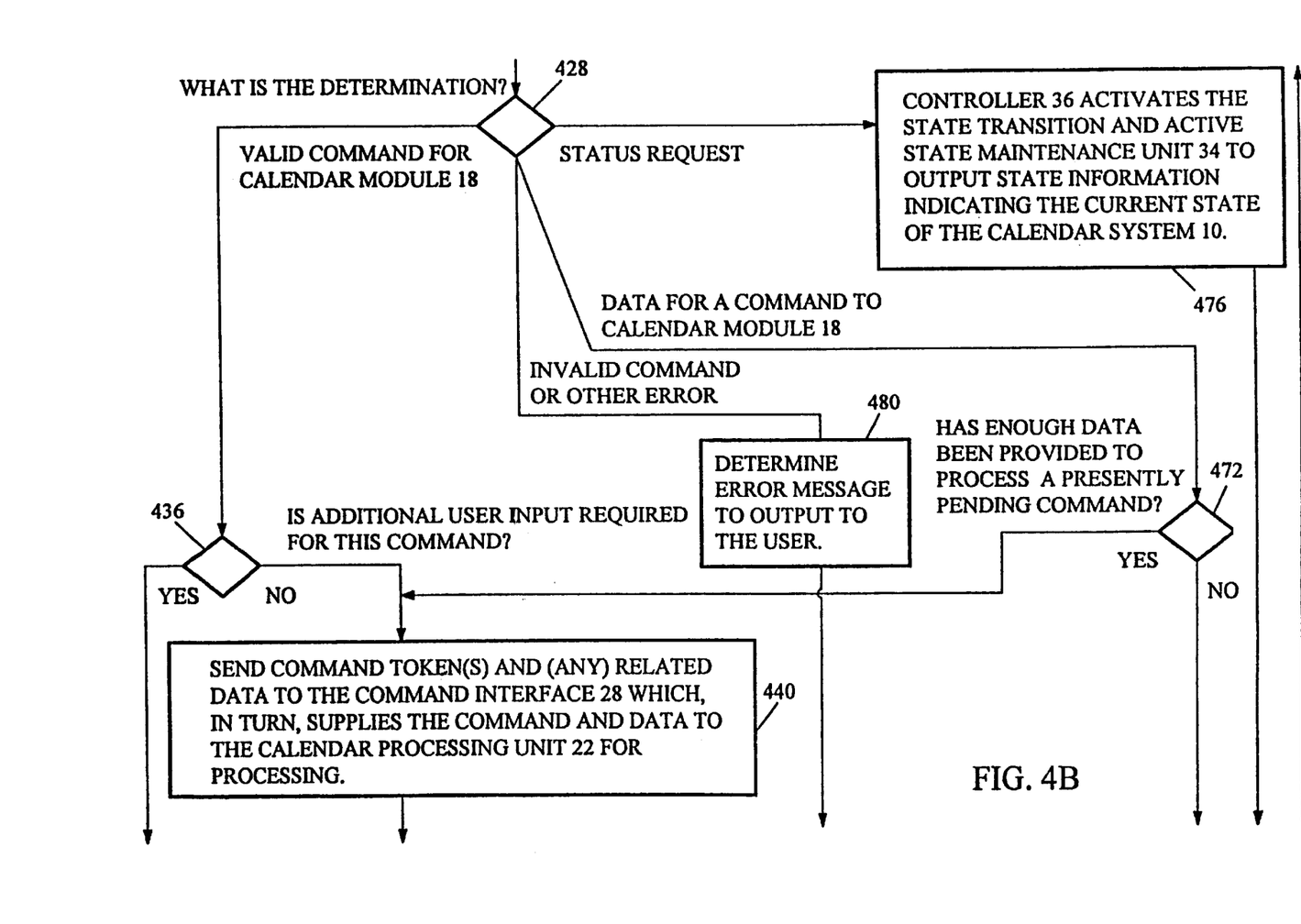

Note that in processing (4.2) through (4.4) above, the controller 36 receives input from the state transition and active state maintenance unit 34 for indicating the (most likely and/or required) type of input expected. Thus, for example, if the current state of the calendar system 10 is such that a new user command must be entered, then the controller 36 uses such information (as provided by the state transition and active state maintenance unit 34) for invoking the command translator 40 which, in turn, assume the user input is a command and (if possible) translates it into one or more corresponding tokens for input into the calendar module 18. Similarly, the controller 36 may use such state information for determining whether the user's input may be interpreted as data to be supplied to the calendar module 18, or whether the user's input is not applicable to the current context and therefore is perceived as an error. Accordingly, in step 428, a determination is made by the controller 36 as to which of the conditions (4.1) through (4.4) is satisfied. Thus, if a valid command for the calendar module 18 is determined, then in step 436, the controller examines the one or more command tokens output by the translator 40 that correspond to the user's input for determining if the command requires additional user input before the one or more command tokens may be provided to the calendar module 18. If it is determined in step 436 that no further information is required for processing the user input command, then in step 440 the command token(s) and any related data supplied with the command is sent to the command interface 28 which, in turn, supplies this input to the calendar processing unit 22. Consequently, in step 444, the calendar processing unit 22 processes the command and sends a status code along with any user related output to the controller 36. Note that since such output may vary according to the embodiment of the calendar processing unit 22 incorporated into the present invention, the output supplied by the calendar processing unit 22 for the controller 36 is unlikely to be the same for different calendar processing unit 22 even though the behaviors of the different calendar processing units may be substantially identical. Accordingly, in step 448, upon receiving output from the calendar module 18, the controller 36 activates the status interpreter 42 for converting the information received from the calendar module into descriptive text to be supplied to the user and/or to the state transition and active state maintenance unit 34. Thus, the status interpreter 42 interprets the return information provided by the calendar module 18 in accordance with the peculiarities of the output from the calendar processing unit 22. Accordingly, note that it is an aspect of the present invention that the status interpreter (in a similar manner to the command translator 40) be configured for processing information peculiar to the calendar processing unit 24 by receiving from the calendar data base management system 24, for example, template and/or parsing control data specific to processing information communicated with the calendar processing unit 22. Subsequently, in step 452, the controller 36 receives state information related to the current state of the calendar system 10 from the state transition and active state maintenance unit 34. Accordingly, in step 456, the controller 36 outputs or conveys any required control information relating to the present state to the speech/visual focus control module 52 so that, for example, a visual user interface may be changed as directed by the user's input.

Figure 4C:
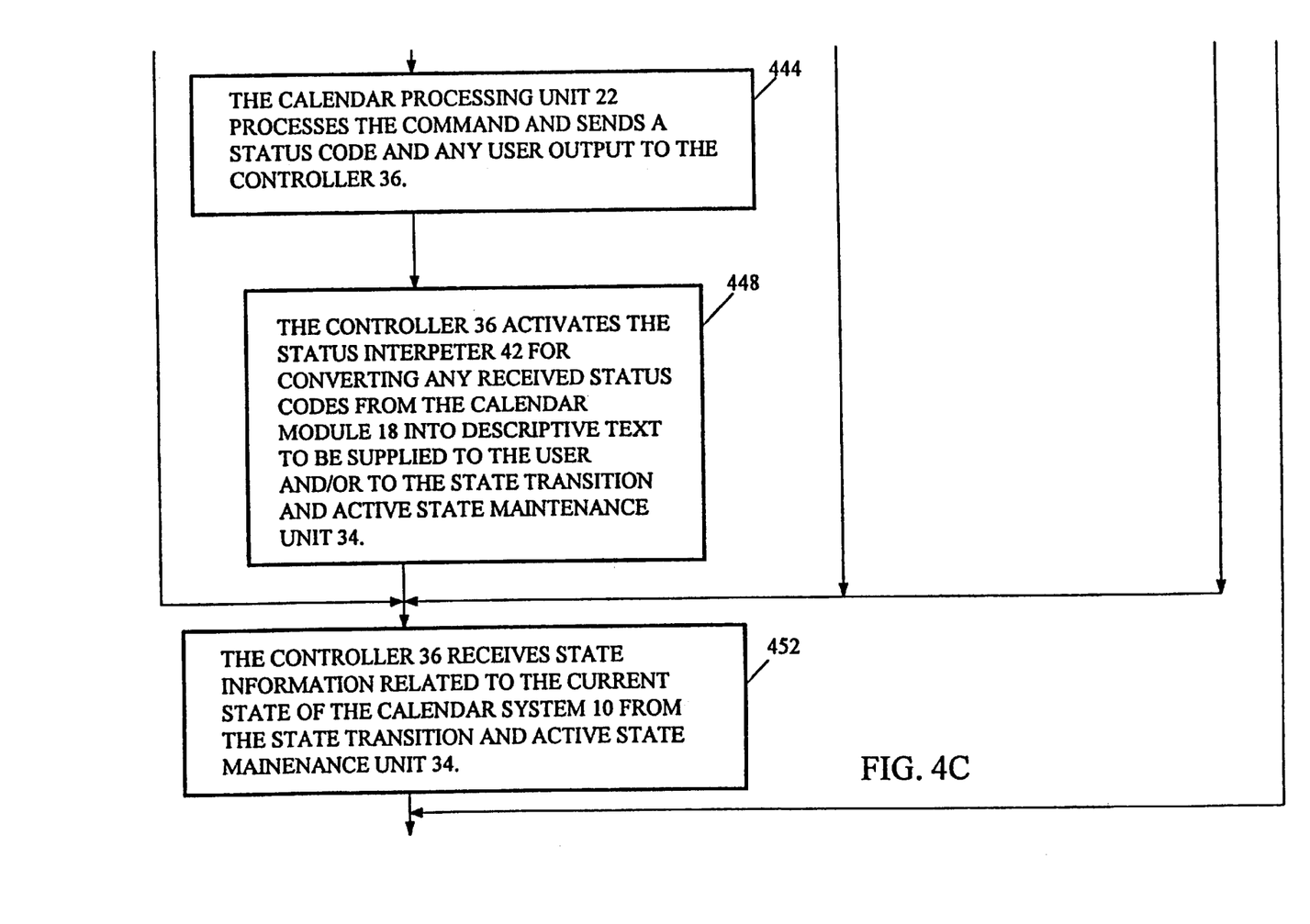

Subsequently, in step 460, a determination is made by the speech/visual focus control module 52 as to whether an output to the user should be spoken or visual. If the output is to be spoken, then in step 464, the controller 36 sends the descriptive text provided by the interpreter 42 to the text-to-speech unit 48 for translation into synthesized speech. However, if the output is to be visual, then step 468 is performed wherein the controller 36 sends the descriptive text to the calendar visual user interface 56 for displaying visually to the user. Note that in some embodiments of the present invention, the controller 36 may send the descriptive text to both the text-to-speech unit 48 and the calendar visual user interface 56 so that the user may receive output that is both spoken and visual substantially simultaneously. Further note that the controller 36 receives an indication as to where to send such descriptive text from the speech/visual focus control module 52. However, in an alternative embodiment of the present invention, such information may be stored in the controller and/or provided by the state transition and active state maintenance unit 34. Subsequently, the flow of control for the present flow chart returns to step 404 for a further iteration of the steps herein.

Returning now to step 436, note that in this decision step for determining if additional user input is required for the user calendar input command that has been received by the controller, then steps 440 through 448 are skipped since the command cannot yet be sent to the calendar module 18. However, the user-supplied command input may necessitate a state change for the calendar system 10 as well as a response to the user indicating that further data is needed before the entered command can be processed. Therefore, steps 452 through 468 are performed as appropriate.

Returning now to step 428, wherein a determination is made by the controller 36 regarding the response required for the user's most recent input, if the controller determines that the most recent input from the user is data for a previously input calendar command, then step 472 is encountered. In this step, the controller 36 determines whether sufficient data has been provided by the user to process the presently pending command. If so, then the steps commencing at step 440 are performed for processing the pending command. However, if still more data is required for this command, then as with the affirmative branch from step 436, only steps 452 through 468 are performed as appropriate.

Alternatively, referring again to step 428, if the controller 36 determines that the most recent user input corresponds to a status request wherein the user desires information describing the present state of the calendar system 10, then step 476 is performed. Accordingly, in this step, the controller activates the state transition and active state maintenance unit 34 to output state information indicating the current state of the calendar system 10. Accordingly, once the controller 36 receives this state information, the steps 456 through 468 are again performed as appropriate.

Figure 5:
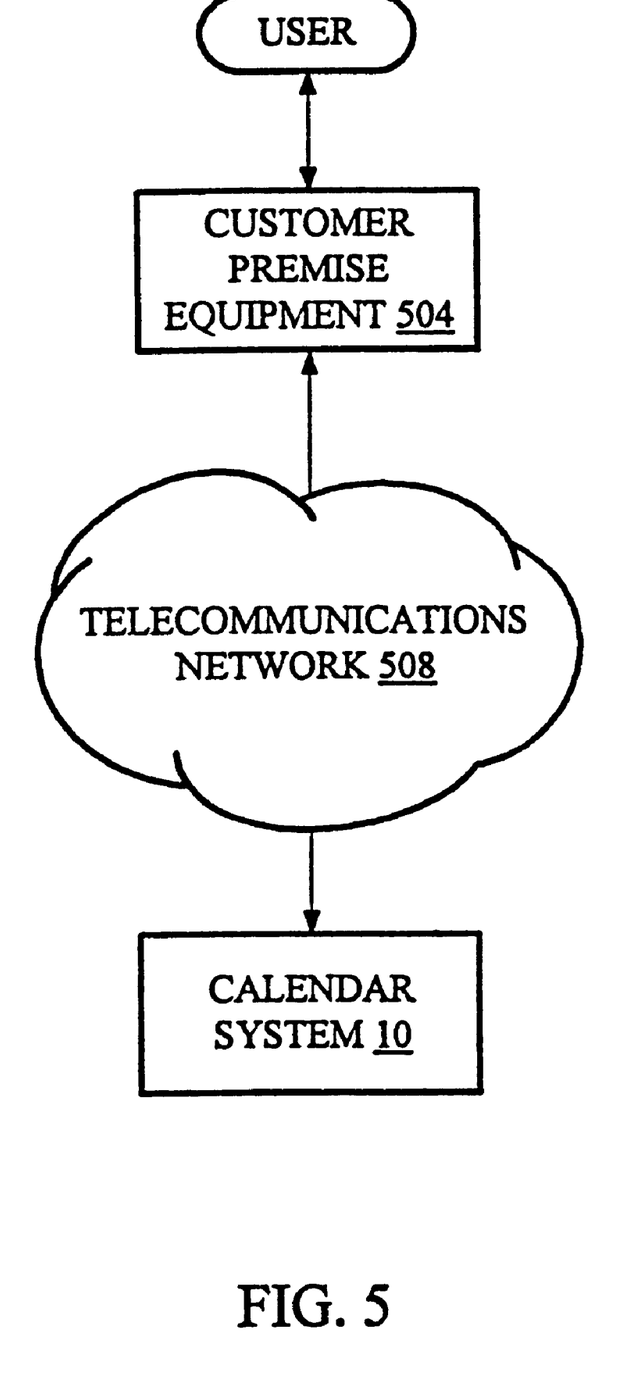
FIG. 5 presents an alternate embodiment of the invention employing customer premise equipment.
Figure 6:
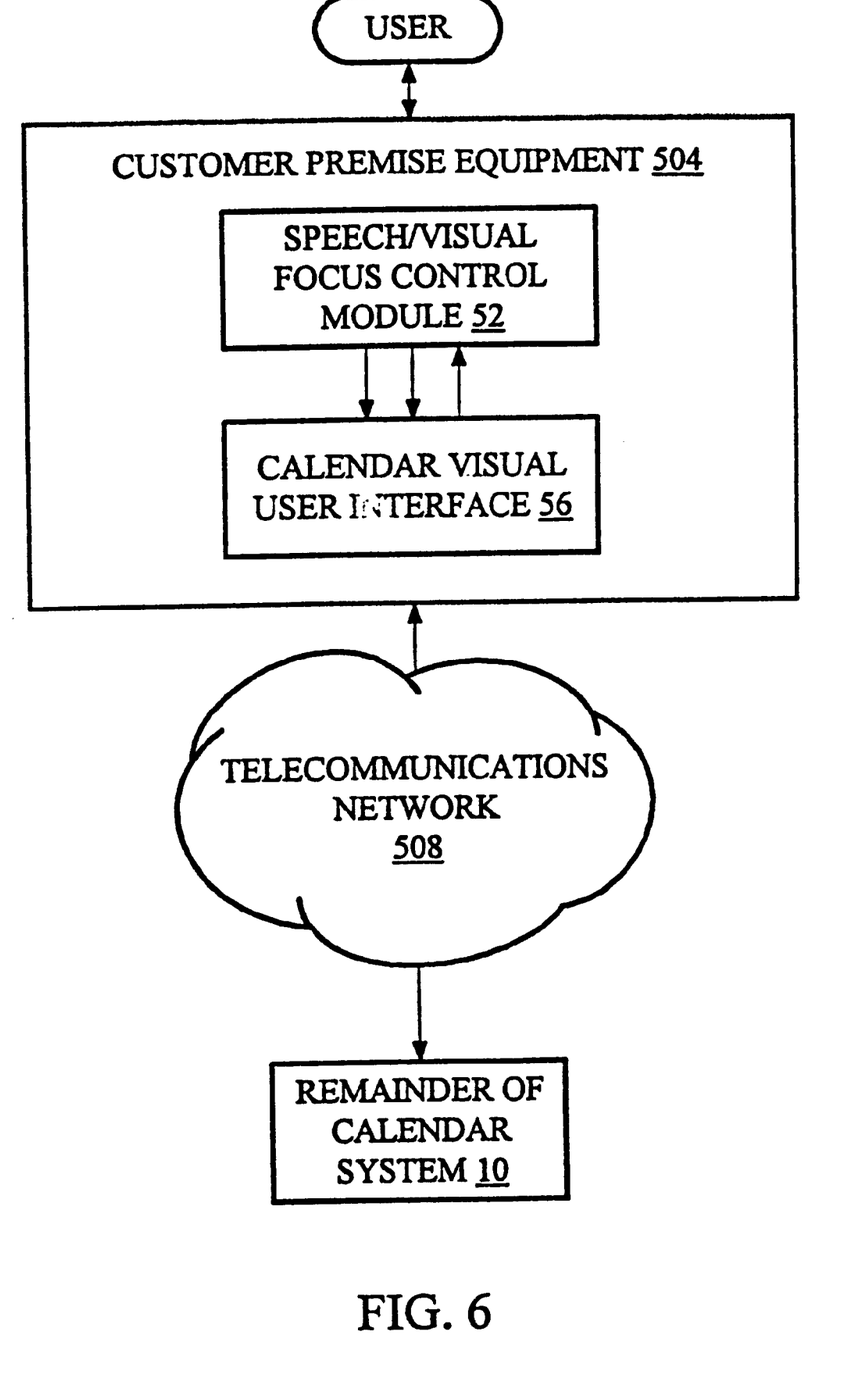
FIG. 6 present an alternate embodiment of the invention where the customer premise equipment includes a personal computer with a computer display terminal.

Referring now to FIGS. 5 and 6, these figures provide two alternative embodiments of the present invention wherein the user utilizes a telephony or telecommunications 508 network, such as a telephone network, a cable network, and for the World Wide Web, for accessing one or more functional components of the calendar system 10. For example, in the embodiment of FIG. 5, customer premises equipment 504 may be utilized to access the calendar system 10 via any one of the above-mentioned telecommunications networks. Accordingly, when the telecommunications network is a telephony network, the customer premises equipment 504 may be a conventional telephony station such as a telephone. Thus, in this embodiment of the present invention, the visual/text input and output modes for communication are not activated, and therefore all user interaction is speech based. Alternatively, referring to FIG. 6, if the customer premises equipment 504 includes, for example, a personal computer with, for example, a typical computer display terminal, then a visual user interface related to the modules such as the speech/visual focus control model 52 and the calendar visual user interface module 56 may be provided on the customer's personal computer, and the remainder of the calendar system 10 may be provided, for example, at a central site of a telephony network such as a telephony central office or a World Wide Web website on the Internet. Moreover, it is also within the scope of the present invention for other embodiments of the present invention to distribute the components of the present invention differently between the customer premises equipment 504 and various nodes or processing cites within a telecommunications network.

Referring again to FIGS. 1A and 1B, the text dialogue inserts provide a simple example of the present invention when utilized in a speech based mode for user input and output. Thus, referring once again to dialogue inserts 14, and more particularly to 14a, the user has activated the present invention by speaking the command, "Make an appointment for September 9." Consequently, after this command has been processed by the speech recognition unit 46 (as in step 412, FIG. 4A), the command is in a text based form that is in turn input to the controller 36 as the text string: "MAKE AN APPT. FOR September. 9." The controller 36, in turn, directs the processing of this input command. In particular, the controller 36, with the assistance of the command translator 40, may determine that further data is required to process the present command (e.g., the positive path from step 436). Accordingly, the controller 36 determines, with the assistance of the state transition and active state maintenance unit 34, an output response to the user such as the text string, "WHAT TIME?", which is output to the text-to-speech unit 48 and subsequently output as speech to the user in dialog insert 14b. Assuming the user subsequently activates the speech recognition unit 46 and speaks, "8 AM" (as in dialog insert 14c), this utterance is converted to the text string, "8 AM.", and input to the controller 36 as indicated. Consequently, assuming all data for the calendar command has now been entered, the controller 36 (with the assistance of the command translator 40) determines a corresponding translation of the user input as the string, "MAKE_APPTCMD, MO=9; TM=08:00," and provides this translation to the calendar module 18. Subsequently, assuming the calendar processing unit 22 processes the command successfully, a status string may be returned (e.g., "STATUS=1") to the controller 36. Accordingly, the controller 36, in turn, activates the status interpreter 42 for interpreting the calendar module output. Assuming the interpretation is, "OK, PLEASE ENTER ANY DESCRIPTION," this string is output to the text-to-speech unit 48 and subsequently, is provided as speech to the user according to dialog insert 14d.

If the user then speaks the predetermined context requesting phrase, "WHERE AM I?", as illustrated in dialog insert 14e, the text equivalent is detected by the status request interpreter 38 and the controller 36 consequently, activates the state transition and active state maintenance unit 34 for outputting a description of the current calendar system 10 processing state such as the description, "YOU'RE IN THE DAY CALENDAR. YOU MAY ENTER A DESCRIPTION FOR A September. 9, 8 AM APPOINTMENT." Accordingly, a spoken vocalization is output to the user as shown by dialog insert 14f.

Assuming now that the user, for example, activates a corresponding visual calendar user interface to configure the present invention so that the next activation of the voice input device is recorded instead of translated, the user can speak, for example, "DON'T FORGET THE PIZZA," as shown in dialog insert 14g. Assuming the voice capture module 60 records the user's speech, then the user can request this speech by played back as indicated by the dialog insert 14h.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with various modifications required by their particular application or uses of the invention. It is intended that the appended claims be construed to include alternative embodiments to the extent permitted by the prior art.

What is claimed is:

1. A voice controlled computer processing calendar system, comprising;

a calendar module for performing a calendar activity, said calendar activity including one of entering, storing, retrieving, modifying and deleting a calendar association;

wherein said calendar association associates data for a calendar time period with user data supplied by a user; and     wherein said calendar module, when performing said calendar activity, transitions from a first computational state to second computational state, each said computational state for representing a computational configuration of said calendar module, and wherein said first computational state represents said computational configuration of said calendar module before performing said calendar activity and said second computational state represents said computational configuration of said calendar module after performing said calendar activity;

a translation module for translating between: (i) signals for communicating speech, and (ii) text;

a context analyzer (a) for receiving communications between said calendar module and, via said translation module, the user, said communications related to a transitioning of said calendar module from said first computational state to said second computational state, sand (b) for establishing, with said communications, context information related to said second computational state of said calendar module;

wherein synthesized speech related to said context information is output of the user using said translation module.

2. An apparatus as claimed in claim 1, wherein said communications includes at least a portion of said user data.

3. An apparatus as claimed in claim 1, wherein at least one of said calendar module, said translation module and said context analyzer is provided by a telephony infrastructure.

4. An apparatus, as claimed in claim 1, wherein said communications is transmitted using a telecommunication network between the user and at least one of said calendar module, said translation module and said context analyzer.

5. An apparatus, as claimed in claim 4, wherein said telecommunication network includes one of a telephone network, a cable network and a World Wide Web website.

6. An apparatus, as claimed in claim 1, further including a visual user interface having:

a visual input means for receiving said user data related to said calendar association; and a visual output means for outputting visual information related to one of said calendar associations.

7. An apparatus, as claimed in claim 6, wherein said context analyzer coordinates a speech output to the user with a visual output to the user, via said visual user interface, so that said speech output includes a spoken version of said visual output.

8. An apparatus, as claimed in claim 1, wherein said translation means includes:

a speech recognition means for translating the user speech into text strings; and a text-to-speech means for translating text into signals for communicating speech.

9. An apparatus, as claimed in claim 1, wherein said context analyzer includes a state transition means for identifying a new computational state of said calendar module using said context information when said context analyzer receives said communications communicated between said calendar module and the user.

10. An apparatus, as claimed in claim 1, wherein said context analyzer responds to requests for information related to a current computational state with text related to said current computational state, said text converted into speech by said translation module.

11. A method for interacting with an electronic calendar, comprising:

determining a user preference for interaction, said interaction being predominantly one of visual and audio based;

communicating with the user substantially visually when the user's interaction preference is audio based;

receiving information for a user specified time related to a user specified description for said specified time during an activation of a first command for said electronic calendar, wherein said information is input as speech when the user's interaction preference is audio based;

translating between: (i) signals for communicating speech, and (ii) text; and providing, when the user's interaction is audio based, the user with a spoken description of a status related to said activation, said status including one of an identification of said first command, an identification of a data field for said first command, and an identification of data in a data field for said first command.

12. A method as claimed in claim 11, wherein said specified time is one of a time within a day, a day, a month, and a year.

13. A method as claimed in claim 11, further including outputting to the user data related to one of a time within a day, a date, and a description of a calendar entry.

14. A method as claimed in claim 11, wherein said step of determining includes configuring said electronic calendar for communicating with the user in one of a visual based and an audio based communication according to a capability of a user communication device.

15. A method as claimed in claim 14, wherein said step of configuring includes setting said electronic calendar for audio based interaction with the user when said user communication device includes a telephone.

16. A method as claimed in claim 14, wherein said step of configuring includes setting said electronic calendar for visual based interaction with the user when said user communication device includes a display terminal.

17. A method as claimed in claim 11, wherein said step of receiving includes transmitting said information over a telecommunications network.

18. A method as claimed in claim 17, wherein said telecommunications network is one of a telephony network, a cable network and an Internet network.

* * * * *

UNITED STATES PATENT AND TRADEMARK OFFICE
CERTIFICATE OF CORRECTION

PATENT NO. : 6,009,398
DATED : December 28, 1999
INVENTOR(S) : Hans-Peter Mueller, Louis Anthony Cox, Jr.

It is certified that error appears in the above-identified patent and that said Letters Patent is hereby corrected as shown below:

In Column 12, line 62: after " state" delete "sand" and insert --and--

Signed and Sealed this

Thirteenth Day of March, 2001

*Attest:*

NICHOLAS P. GODICI

*Attesting Officer*   *Acting Director of the United States Patent and Trademark Office*